United States Patent [19]

Sakurai

[11] Patent Number: 5,529,265
[45] Date of Patent: Jun. 25, 1996

[54] DISC SIGNAL DISPLAY SYSTEM FOR USE WITH PLURAL SEATS

[75] Inventor: Bunkichi Sakurai, Kanagawa, Japan

[73] Assignee: Sony Corporation, Tokyo, Japan

[21] Appl. No.: 263,068

[22] Filed: Jun. 21, 1994

[30] Foreign Application Priority Data

Jun. 30, 1993 [JP] Japan .................................. 5-183358

[51] Int. Cl.$^6$ .......................... B64D 11/06; B64D 25/04; A47C 7/72
[52] U.S. Cl. ................................... 244/118.5; 244/118.6; 244/122 R; 248/919; 297/188.01; 297/232
[58] Field of Search .............................. 244/118.5, 118.6, 244/122 R; 248/917, 919, 923, 664, 665; 358/254; 297/188.01, 188.21, 232

[56] References Cited

U.S. PATENT DOCUMENTS

| | | | |
|---|---|---|---|
| 3,614,040 | 10/1971 | Martinez | 248/664 |
| 4,647,980 | 3/1987 | Steventon et al. | 358/254 |
| 4,702,519 | 10/1987 | Lobanoff | 297/188.01 |
| 5,024,415 | 6/1991 | Purens | 248/923 |
| 5,148,282 | 9/1992 | Sedighzadeh | 358/249 |
| 5,177,616 | 1/1993 | Riday | 248/919 |
| 5,179,447 | 1/1993 | Lain | 358/254 |
| 5,267,775 | 12/1993 | Nguyen | 297/217 |
| 5,374,104 | 12/1994 | Moore et al. | 297/8.16 |
| 5,398,991 | 3/1995 | Smith et al. | 297/194 |

FOREIGN PATENT DOCUMENTS 54-105499  7/1979  Japan .

*Primary Examiner*—Andres Kashnikow
*Assistant Examiner*—Virna Lissi Mojica
*Attorney, Agent, or Firm*—Ronald P. Kananen

[57] ABSTRACT

A video signal display system is provided at a back of each of a number of seats arranged in rows and columns. A recess is formed in the rear portion of the back of each seat and spherical-shaped support units for pivotally supporting a picture display unit of the display system are provided on the bottom of the recess and at a mid portion of the back surface of the picture display unit for assembling the picture display unit in the recess. The spherical-shaped supporting units are rotated for varying the position of the screen of the picture display unit built in the rear portion of the back of the seat to an easy-to-view position.

14 Claims, 4 Drawing Sheets

DISC SIGNAL DISPLAY SYSTEM FOR USE WITH PLURAL SEATS

BACKGROUND OF THE INVENTION

1. Field of the Invention

This invention relates to a video signal display system installed for a large number of seats arranged substantially in a matrix configuration, such as seats of an aircraft, train or a theater.

2. Description of the Related Art

In a vehicle, such as an aircraft, long-distance train or a long-distance bus, in which the passengers are compelled to be seated for a prolonged time, video services, such as presentation of motion pictures, television programs, video games or the information for sight-seeing or catalog shopping, are presented in order to relieve the passengers of boredom and to offer them the necessary information concerning the destination as well as to make them satisfied as to their travel. Such video services are offered by a picture display device, such as a liquid crystal monitor, built in the rear side of a back portion of a forward side seat.

The seat for an aircraft is designed according to a reclining seat system in which the back of the seat may be tilted in the fore-and-aft direction. If the passenger seated in the forward side seat adjusts the back of the seat, the screen built into the rearward portion of the seat back is changed in its position, so that the screen becomes difficult to view or occasionally becomes unusable. A seat for an aircraft provided with a television receiver which will overcome the above-mentioned problem is disclosed in JP KOKAI Utility Model Publication No. 54-105499, according to which both sides of a television receiver are rotatably supported by a rotary lever so that the television receiver may be tilted in the up-and-down direction.

With the above-described seat fitted with the television receiver, if the passenger seated in the forward side seat adjusts the back of the seat so that the position of the screen of the television receiver is changed, the television receiver may be adjusted in the up-and-down direction for adjusting the height position of the display screen with respect to the optimum line of sight of the viewer, so that the video services may be continuously received.

Meanwhile, the seat having a television receiver built into the rear side of the seat back has become available as a result of the debut of a liquid display device which is relatively thin and inexpensive and which is capable of constituting a large-sized display screen. However, the liquid crystal display unit exhibiting polarization characteristics present a problem that the screen is difficult to view depending on the angle of the line of sight of the viewer. Recently, group tours have become popular and there may be many instances in which passengers seated in neighboring seats have a conversation as they view the same screen. However, it may occur frequently that the picture displayed on the liquid crystal screen is difficult to view and the conversation cannot become lively.

The above-described seat provided with the television receiver is intended for personal use and cannot be adjusted for setting the display screen towards a mid position between the two neighboring seats. On the other hand, if the seats are arrayed in plural rows and there is left only a narrow space between the neighboring seats, it may occur that the picture displayed on the display screen of the picture display device of a seat disturbs or otherwise is not agreeable to the passenger seated in the neighboring seat.

OBJECT AND SUMMARY OF THE INVENTION

It is an object of the present invention to provide a video signal display system for use with a plurality of seats in which the direction of the display screen may be adjusted to the line of sight of the viewer and in which, even if the direction of the seat provided with the display system is changed, the direction of the display screen may be correspondingly changed in order to permit the viewer to view the screen at all times from an easy- to-view position.

The video signal display system according to the present invention has a plurality of picture display modules each having a display screen and each being arranged within a recess formed on the back surface of one of a plurality of seats so that the display screen may be viewed from the rear side of the seat, and means for pivotally supporting the picture display module with respect to the seat. The pivotal supporting means includes a spherical-shaped support and a rotation supporting fulcrum member in which the support is fitted.

One of the spherical-shaped support and the rotation supporting fulcrum member is secured on the bottom surface of the recess and the other is supported at a mid portion on the back surface of the picture display module.

The pivotal supporting means also includes a resilient supporting member secured to one of the bottom surface of the recess and the mid portion on the back surface of the recess to which the spherical-shaped fulcrum member is secured. The resilient supporting member is resiliently engaged with the outer peripheral surface of the fulcrum member.

If, with the video signal display system provided on the seat of the present invention, a passenger seated in a seat on the forward side of a seat in which a viewer is seated tilts the seat, or the viewer tilts his own seat, it suffices for the viewer to manually thrust upper or lower peripheral portions of a picture display device of the forward side seat in order to adjust the display screen of the picture display device so as to be matched to his or her line of sight. Similarly, if the same display screen is viewed by two passengers seated in neighboring seats, or if a viewer intends to avoid the situation in which the picture he or she is viewing might be disturbing to the neighboring passenger, it suffices for the viewer to manually thrust the left and right peripheral portions of the picture display device in order to adjust the screen position of the picture display device in the left-and-right direction. The control operations for the picture display device, such as channel switching or sound volume adjustment operations, may be performed from the seat of the viewer using a controller provided in the arm part of the seat.

DETAILED DESCRIPTION OF THE INVENTION

Figure 1:
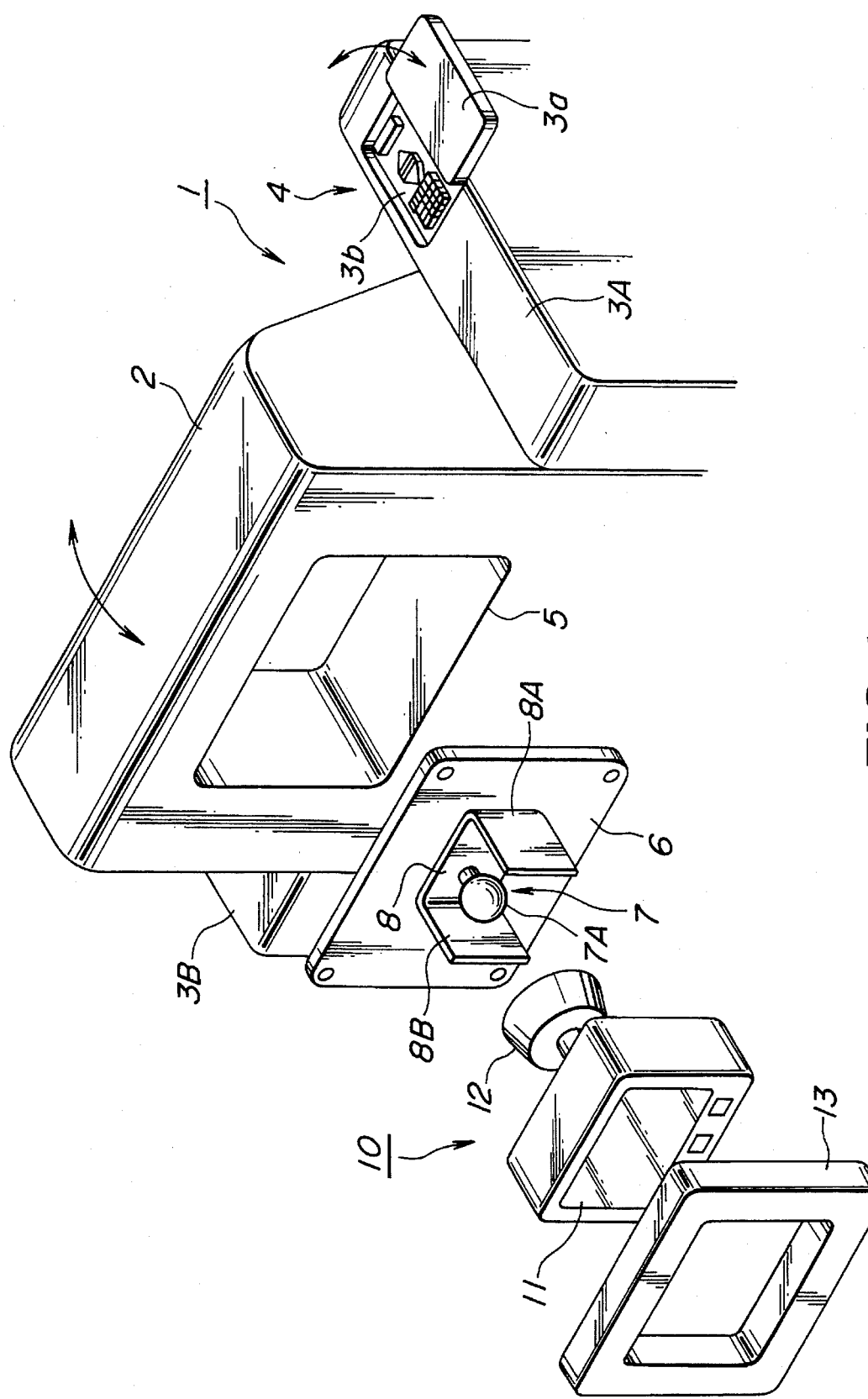
FIG. 1 is an exploded schematic perspective view of a seat provided with a picture display device according to the present invention.

Referring to the drawings, preferred embodiments of the present invention will be explained in detail.

Referring to FIG. 1, a seat 1 provided with a picture display device according to the present invention is used as a seat for an aircraft or a long-distance train, in which a large number of such seats are arrayed in a larger number of rows so as to be neighboring to one another in the fore-and-aft and in the left-and-right directions. The seat 1 has a back 2 and both arm parts 3A and 3B and is designed as a reclining seat in which the back 2 may be inclined in the fore-and-aft direction at a suitable angle. The back 2 of the seat 1 has a pre-set thickness, and a liquid crystal monitor unit 10 for receiving picture services, such as motion pictures or tourist guides in the aircraft, is built on the back surface of the back 2, as will be explained later.

On a right arm part 3A of the seat 1, there is provided a lid 3a which may be opened about a hinge, not shown. Within a recess 3b of the arm part 3A, closed by the lid 3a, there is mounted a controller 4, such as a power switch, a channel changeover device or a volume adjustment device for the monitor unit 10, which is given herein as an example of the picture display device built into the back surface of the back 2. Although not shown, a headphone set device for the liquid crystal monitor unit 10 is also built into the seat 1.

The back surface of the back 2 of each seat 1 has a recess 5 in which the liquid crystal monitor unit 10 is built, as shown in FIG. 1. The recess 5 is generally rectangular with its longer side lying horizontally. A mounting plate 6, which is also rectangular in shape, with its longer side lying horizontally, is tightly mounted on the bottom surface of the recess 5 with set screws, not shown. A spherical-shaped support 7, having a spherical-shaped rotation supporting terminal fulcrum portion 7A and a resilient supporting member 8, formed by a resilient metal plate, are mounted on a mid portion of the major surface of the mounting plate 6.

Figure 5:
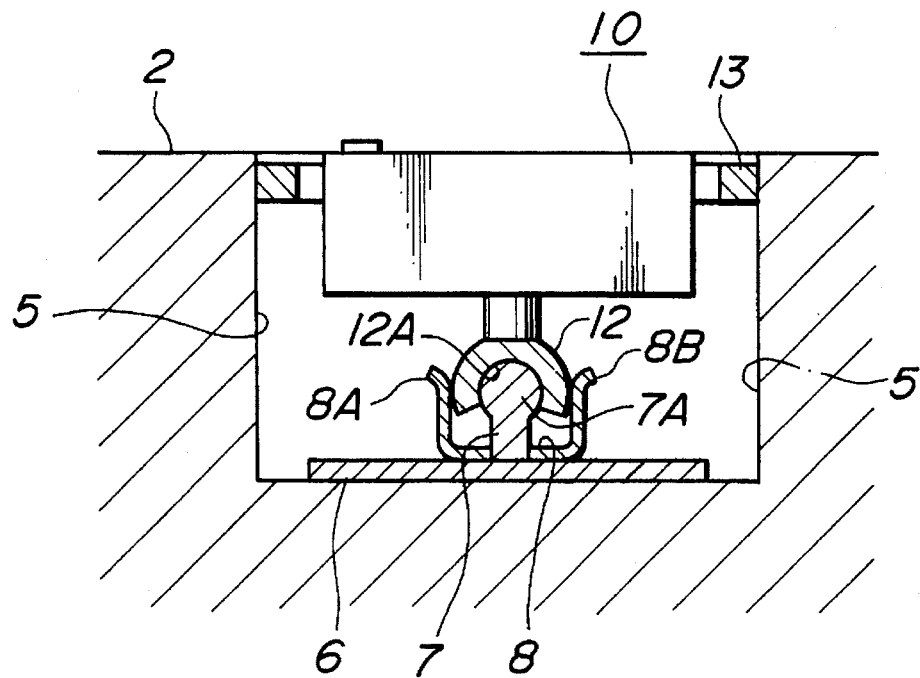
FIG. 5 is a horizontal cross-sectional view showing a seat provided with the picture display device, with the picture display device being set so that its display surface is parallel to the surface of the back.

The resilient supporting member 8 is shaped in the form of a letter U and is formed of, for example, a metal plate spring. The supporting member 8 is mounted so that a pair of resilient arms 8A and 8B thereof are disposed on both sides of the spherical-shaped rotation supporting terminal fulcrum portion 7A of the spherical-shaped support 7. The liquid monitor unit 10 is a small-sized monitor unit having a display surface 11 of 4 to 6 inches in size and is formed as one with a rotation supporting fulcrum member 12 in which the rotation supporting terminal fulcrum portion 7A is fitted in a manner which will be explained subsequently. The rotation supporting fulcrum member 12 is frusto-conical in shape and has an inner bore which, as shown in FIG. 5, plays the role of a bearing surface by having a substantially semi-spherical profile corresponding to the spherical outer shape of the rotation supporting terminal fulcrum portion 7A. The spherical-shaped support 7 and the rotation supporting fulcrum member 12 make up a spherical-shaped supporting mechanism supporting the mid portion of the back surface of the liquid crystal monitor unit 10.

The rotation supporting fulcrum member 12 has its outside diameter slightly less than the horizontal distance between the resilient arms 8A and 8B of the resilient supporting member 8. Consequently, the liquid crystal monitor unit 10 is supported by the spherical-shaped support 7 by being assembled via the opening of the recess 5 so that the rotation supporting terminal fulcrum portion 7A of the spherical-shaped support 7 is fitted in the inner bore of the rotation-supporting fulcrum member 12 provided on the back surface of the monitor unit 10. With the liquid crystal monitor unit 10 being supported by the spherical-shaped support 7, the resilient arms 8A, 8B are resiliently engaged with both longitudinal lateral sides of the rotation-supporting fulcrum member 12. Thus the rotation-supporting fulcrum member 12, and hence the liquid crystal monitor unit 10, is maintained at a constant posture under the resiliency of the resilient supporting member 8.

The liquid crystal monitor unit 10 has its cable introduced through the inside of the back 2 of the seat 1 via a gap between the bottom surface of the recess 5 and the back surface of the liquid crystal monitor unit 10 so as to be connected to a picture supply unit or the controller 4 assembled into the right arm part 3A connected to a duct which is embedded in the floor.

A frame-shaped cover member 13 is fitted in the opening part of the recess 5 provided in the back 2 of the seat 1. The cover member 13 has its opening portion dimensioned so as to be slightly larger than the outer size of the liquid crystal monitor unit 10, so that, if the liquid crystal unit 10 is positioned with its front surface lying parallel to the back 2 of the seat 1, that is if its display surface 11 is directed forwards, a suitable gap is defined between the outer rim of the liquid crystal monitor unit 10 and the cover member 13, the front surface of the liquid crystal monitor unit 10 being substantially flush with the back 2.

With the above-described seat 1, by mounting the liquid crystal unit 10 within the recess 5 formed in the rear side of the back 2 so that the mid portion on the back surface of the unit 10 is supported by the spherical-shaped rotation supporting terminal fulcrum portion 7A of the spherical-shaped support 7 being fitted in the inner bore of the rotation-supporting fulcrum member 12 designed as a substantially semi-spherical bearing surface, the liquid crustal monitor unit 10 may be adjusted to an optimum position according to the state of the back 2 of the forward seat or according to the liking of the viewer.

That is, assuming that a number of seats 1A to 1D are arranged in plural rows and columns in adjacency to one another in the fore-and-aft and in the left-and-right directions, if a passenger seated in the seat 1B tilts the back 2B towards the rear, the screen 11 of the liquid monitor unit 10B is directed downwards, so that it is difficult to view from the rear side seat. If at this time the upper portion of the liquid crystal monitor unit 10B is thrust manually, the bearing surface 12A of the rotation-supporting fulcrum member 12 is slid on the outer periphery of the rotation supporting fulcrum portion 7A of the spherical-shaped support 7, against the bias exerted by the resilient arms 8A, 8B of the resilient supporting member 8 on the rotation supporting fulcrum member 12, so that the liquid crystal monitor unit 10 is rotated upwards with the spherical-shaped support 7 as a fulcrum point and hence the display surface 11 is adjusted to a position suited to the line of sight of the viewer.

Figure 2:
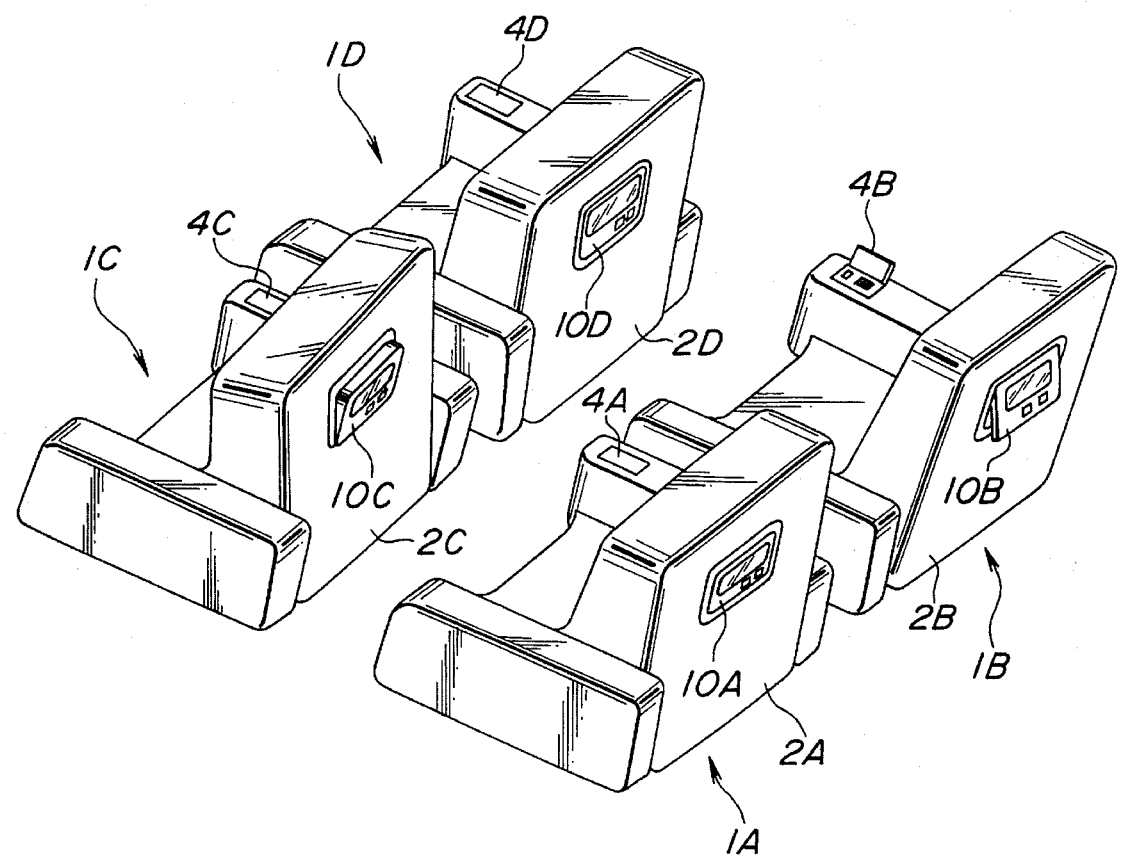
FIG. 2 is a schematic perspective view showing aircraft seats each provided with the picture display device.
Figure 3:
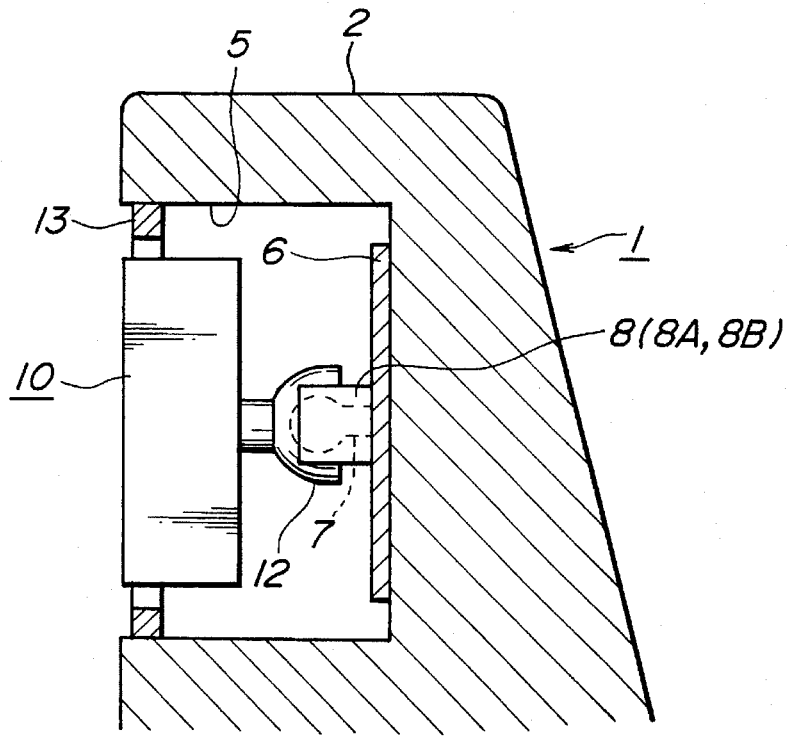
FIG. 3 is vertical cross-sectional view showing a seat provided with the picture display device, with the picture display device being set so that its display surface is parallel to the surface of the back.
Figure 4:
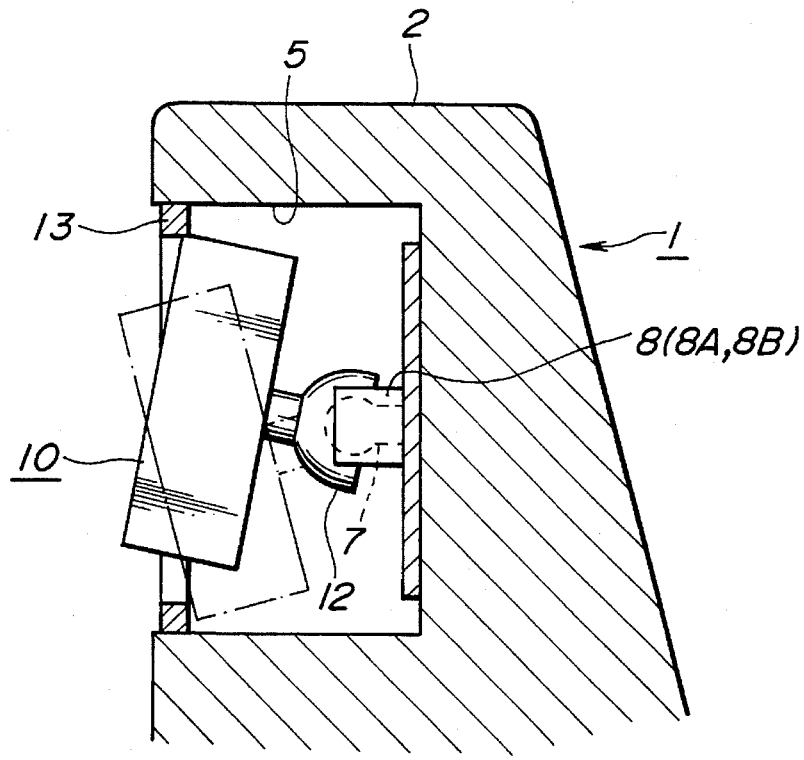
FIG. 4 is vertical cross-sectional view showing a seat provided with the picture display device, and showing the operation of vertically adjusting the display surface of the display device.

Similarly, if a passenger seated in the seat 1C tilts the back 2B towards the front, as shown in FIG. 2, the display surface 11 of the liquid monitor unit 10C is directed upwards, so that it is difficult to view from the rear side seat. If at this time the lower portion of the liquid crystal monitor unit 10C is thrust manually, the liquid crystal monitor unit 10 is rotated downwards with the spherical-shaped support 7 as a fulcrum point against the bias exerted by the resilient arms 8A, 8B of the resilient supporting member 8 on the rotation supporting fulcrum member 12, by the above-described operation, as indicated by a chain-dotted line in FIG. 4, and hence the display surface 11 is adjusted to a position matched to the line of sight of the viewer.

Figure 6:
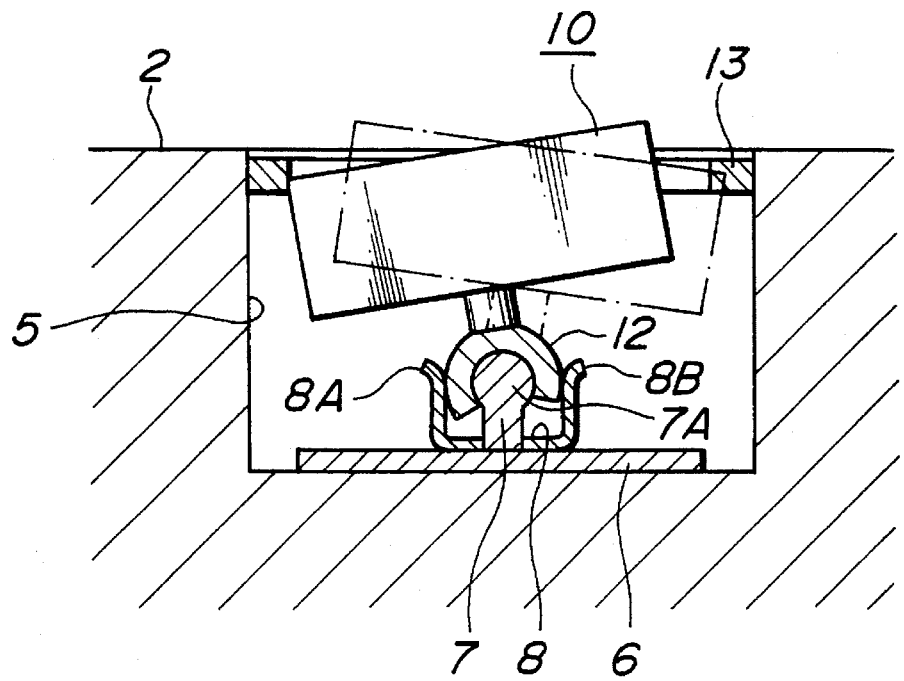
FIG. 6 is a horizontal cross-sectional view showing a seat provided with the picture display device, and showing the operation of adjusting the display surface of the display device in the left-and-right direction.

On the other hand, if the passengers seated in adjacent seats 1A and 1B in FIG. 2 view the screen of the liquid monitor unit 10C built into the back 2C of the forward side seat 1C, the display surface 11 is difficult to view from the seat 1B. If at this time the right lateral side of the liquid crystal monitor unit 10C is thrust manually, the liquid crystal monitor unit 10 is rotated towards right with the spherical-shaped support 7 as a fulcrum point against the bias exerted by the resilient arms 8A, 8B of the resilient supporting member 8 on the rotation supporting fulcrum member 12, as in the case of the above-described operation in the vertical direction, as shown in FIG. 6, and hence the display surface 11 is adjusted to a position matched to the line of sight of the viewer.

Similarly, if the passengers seated in adjacent seats 1A and 1B in FIG. 2 view the screen of the liquid monitor unit 10D built into the back 2D of the forward side seat 1D, the display surface 11 is difficult to view from the seat 1A. However, by manually thrusting the left side portion of the liquid monitor unit 10D, the liquid monitor unit 10D is rotated towards left, with the support 7 as a fulcrum, as indicated by a chain line in FIG. 6. Thus the monitor unit 10D may be adjusted so that its display surface 11 is directed towards the passengers seated in the seats 1A and 1B.

The liquid crystal monitor unit 10 may be adjusted not only in the up-and-down and left-and-right directions, but also in oblique directions, by manually thrusting its four corners. After the liquid crystal monitor unit 10 is set so that its display surface 11 is at an optimum position, power turn-on, channel setting or sound volume adjustment may be made with the aid of the controller 4 built into the right arm part 3A of the seat 1, or picture services may be enjoyed using the headphone set.

With the above-described seat 1, the controller 4 taking charge of power turn on or channel switching is provided as a stationary unit in the recess 3b provided in the arm part 3. However, if radio troubles or the like hindrances are not produced, the controller 4 may be designed as a remote-control unit 4 provided in the recess 3b. The liquid crystal monitor unit 10 as a picture display unit may similarly be replaced by any suitable small-sized display unit.

What is claimed is:

1. A video signal display system for use with a plurality of seats, comprising:
    a plurality of picture display modules each having a display screen and each being arranged within a recess formed on a back surface of one of a plurality of the seats so that the display screen may be viewed from the rear side of said seat; and
    means for pivotally supporting said picture display module with respect to said seat, said supporting means having a spherical-shaped support and a rotation supporting fulcrum member in which said support is fitted;
    wherein one of the spherical-shaped support and the rotation supporting fulcrum member is secured to a surface defining said recess and the other is secured to back surface of the picture display module.

2. The system as claimed in claim 1, wherein said back surface of the seats is tiltable in the fore-and-aft direction.

3. The system as claimed in claim 1, wherein said pivotally supporting means also comprises a resilient supporting member secured to one of the surface defining the recess and the back surface of the picture display module, said resilient supporting member being secured to the same surface as said spherical-shaped fulcrum member and being resiliently engaged with the outer peripheral surface of said fulcrum member.

4. A video signal display system for use with a plurality of seats, comprising:
    a plurality of picture display modules each having a display screen and each being arranged within a recess formed on a back surface of one of a plurality of the seats so that the display screen may be viewed from the rear side of said seat; and
    means for pivotally supporting said picture display module with respect to said seat, said supporting means having a spherical-shaped support and a rotation supporting fulcrum member in which said support is fitted;
    one of the spherical-shaped support and the rotation supporting fulcrum member being secured to the bottom surface of said recess and the other being secured to a mid portion on the back surface of the picture display module;
    wherein said pivotally supporting means also comprises a resilient supporting member secured to one of the bottom surface of the recess and the mid portion on the back surface of the picture display module, said resilient supporting member being secured to the same surface as said spherical-shaped fulcrum member and being resiliently engaged with the outer peripheral surface of said fulcrum member and wherein a controller for said picture display module is provided in an arm part of a rearward seat.

5. The system as claimed in claim 1, wherein said spherical-shaped support is secured to the surface defining said recess and said rotation supporting fulcrum member is secured to the back surface of display module.

6. The system as claimed in claim 1, wherein the surface defining said recess comprises a bottom surface of said recess.

7. The system as claimed in claim 1, wherein the other of the spherical-shaped support and the rotation supporting fulcrum member is secured to a mid portion of the back surface of the picture display module.

8. The system as claimed in claim 1, wherein said pivotally supporting means supports said display module while said display module is pivoted in a vertical direction, a horizontal direction, or a combination of both a vertical and horizontal direction.

9. The system as claimed in claim 1, wherein a controller for said picture display module is provided in an arm part of a rearward seat.

10. The system as claimed in claim 1, further comprising a mounting plate for securing one of the spherical-shaped support and the rotation supporting fulcrum member to the surface defining said recess.

11. The system as claimed in claim 1, further comprising a cover for being inserted within said recess and around said display module.

12. The system as claimed in claim 3, wherein said resilient supporting member comprises a pair of resilient arms for engaging opposite sides of the rotation supporting fulcrum member.

13. The system as claimed in claim 1, wherein said display module comprises a liquid crystal monitor unit.

14. The system as claimed in claim 1, wherein said spherical-shaped support and said rotation supporting fulcrum member are pivotal relative to each other about two orthogonal axes and said display module is pivotal relative to the back surface of the seat about said two orthogonal axes.

* * * * *